United States Patent
Guihard et al.

(10) Patent No.: US 7,811,052 B2
(45) Date of Patent: Oct. 12, 2010

(54) RADIALLY-COMPACT ASSEMBLY BETWEEN A TURBINE SHAFT AND A STUB AXLE OF A TURBOMACHINE COMPRESSOR SHAFT

(75) Inventors: Frederic Guihard, Merignac (FR); Gilles Alain Charier, La Grande Paroisse (FR)

(73) Assignee: SNECMA, Paris (FR)

( * ) Notice: Subject to any disclaimer, the term of this patent is extended or adjusted under 35 U.S.C. 154(b) by 898 days.

(21) Appl. No.: 11/625,041

(22) Filed: Jan. 19, 2007

(65) Prior Publication Data

US 2007/0212226 A1    Sep. 13, 2007

(30) Foreign Application Priority Data

Jan. 27, 2006    (FR) .................................. 06 50289

(51) Int. Cl.
    *F03D 11/00* (2006.01)
(52) U.S. Cl. ................................ 415/122.1; 416/244 A
(58) Field of Classification Search .................... 415/68, 415/69, 229, 122.1, 124.2; 416/124, 244 A, 416/244 R
    See application file for complete search history.

(56) References Cited

U.S. PATENT DOCUMENTS

| | | | |
|---|---|---|---|
| 3,449,926 A | 6/1969 | Hawkins | |
| 3,571,886 A | 3/1971 | Corsmeier | |
| 3,602,535 A | * 8/1971 | Behning et al. | ............. 403/118 |

FOREIGN PATENT DOCUMENTS

| | | |
|---|---|---|
| DE | 1 087 410 | 8/1960 |
| EP | 0 299 266 A1 | 1/1989 |
| GB | 2 393 774 A | 4/2004 |

* cited by examiner

*Primary Examiner*—Edward Look
*Assistant Examiner*—Dwayne J White
(74) *Attorney, Agent, or Firm*—Oblon, Spivak, McClelland, Maier & Neustadt, L.L.P.

(57) ABSTRACT

An assembly between a turbine shaft and a stub axle of a turbomachine compressor shaft, the assembly including a substantially cylindrical compressor shaft stub axle, a substantially cylindrical turbine shaft disposed coaxially inside the compressor shaft stub axle, a mechanism for transmitting torque between the turbine shaft and the compressor shaft stub axle, and a clamping mechanism for clamping a downstream end of the turbine shaft to the compressor shaft stub axle. The compressor shaft stub axle has a plurality of teeth extending radially from its inside surface, and the turbine shaft is provided at its downstream end with a plurality of axial slots, the teeth of the stub axle co-operating with the slots of the turbine shaft.

11 Claims, 3 Drawing Sheets

# RADIALLY-COMPACT ASSEMBLY BETWEEN A TURBINE SHAFT AND A STUB AXLE OF A TURBOMACHINE COMPRESSOR SHAFT

BACKGROUND OF THE INVENTION

The present invention relates to the general field of turbomachines in which the shaft of the low-pressure spool comprises a turbine shaft assembled to a stub axle of a compressor shaft. The invention relates more precisely to an assembly of this type that is radially compact.

In a turbomachine, the gas coming from combustion of an air/fuel mixture drives the low-pressure turbine in rotation. This turbine has a low-pressure turbine shaft that is coupled to a low-pressure compressor shaft in order to rotate the low-pressure compressor of the turbomachine. For this purpose, the high-pressure turbine shaft is housed inside a stub axle of the low-pressure compressor shaft which is coupled thereto by fluting. A nut is tightened onto the downstream end of the low-pressure turbine shaft and serves to hold this coupling together, axially. More precisely, the stub axle of the low-pressure compressor shaft presents an internal annular collar that comes into abutment radially against the high-pressure turbine shaft and into abutment axially against the clamping nut.

That type of assembly presents the drawback of possessing a radial size that is relatively large. This size comes both from the thickness needed for tightening the nut on the low-pressure turbine shaft and the thickness needed for obtaining a bearing surface of sufficient size between the low-pressure turbine shaft and the stub axle of the low-pressure compressor shaft. Such radial size is particularly harmful when dimensioning low-pressure turbine shafts for a contra-fan type turbomachine (i.e. when there are two contrarotating fans mounted at the front).

OBJECT AND SUMMARY OF THE INVENTION

A main aim of the present invention is thus to mitigate such drawbacks by providing an assembly that is radially compact.

This object is achieved by an assembly between a turbine shaft and a stub axle of a turbomachine compressor shaft, the assembly comprising a substantially cylindrical compressor shaft stub axle, a substantially cylindrical turbine shaft disposed coaxially inside the compressor shaft stub axle, means for transmitting torque between the turbine shaft and the compressor shaft stub axle, and clamping means for clamping a downstream end of the turbine shaft to the compressor shaft stub axle, and in which, in accordance with the invention, the compressor shaft stub axle has a plurality of teeth extending radially from its inside surface, and the turbine shaft is provided at its downstream end with a plurality of axial slots, the teeth of the stub axle co-operating with the slots of the turbine shaft.

Such an assembly makes it possible to group together over a given common thickness, not only the zone needed for the bearing surface between the turbine shaft and the stub axle of the compressor shaft, but also the zone needed for axial retention. This results in a radial size that is small compared with conventional assemblies (the saving in radial size comes to about 5 millimeters (mm)). In addition, in an application to a contra-fan type turbomachine, this assembly can facilitate the operations of mounting and removing the outer low-pressure turbine shaft.

According to an advantageous characteristic of the invention, the clamping means comprise a nut tightened on a thread formed at the downstream end of the turbine shaft, said nut having a plurality of axial slots each formed between two adjacent tongues and co-operating with the teeth of the compressor shaft stub axle.

Preferably, the clamping means further comprise a blocking ring for blocking the nut and having a plurality of openings that co-operate with the slots in the clamping nut to prevent said nut from turning. Under such circumstances, the clamping means further comprise a retaining ring for holding the blocking ring axially.

Advantageously, each thread on the threaded downstream end of the turbine shaft is asymmetrical relative to a radial midplane, thereby reducing the bending forces at the downstream end of the turbine shaft.

The assembly may also comprise a ring forming an axial adjustment spacer, said ring having a plurality of teeth that are received both in the ends of the slots in the turbine shaft and in axial abutment against the teeth of the compressor shaft stub axle.

The invention also provides a turbomachine including an assembly between a low-pressure turbine shaft and a stub axle of a low-pressure compressor shaft, as defined above.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
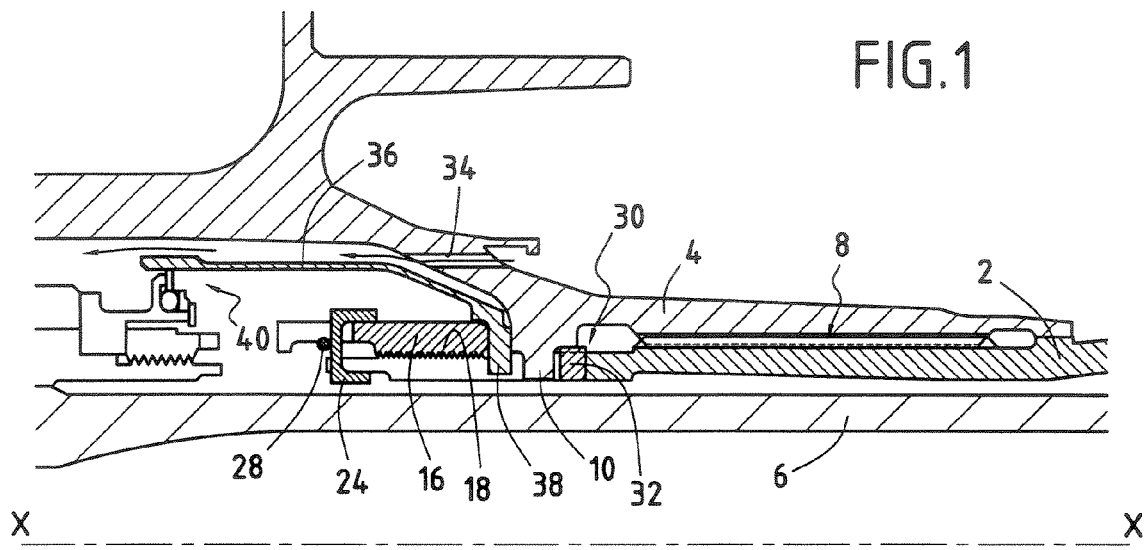
FIG. 1 is a fragmentary longitudinal section view of an assembly of the invention.

With reference to FIG. 1, the assembly of the invention comprises a substantially cylindrical turbine shaft 2 centered on a longitudinal axis X-X of a turbomachine. The assembly also comprises a compressor shaft stub axle 4 which is also substantially cylindrical.

For an application to a turbomachine of the contra-fan type, the turbine shaft 2 may for example be the outer low-pressure turbine shaft (as opposed to the inner low-pressure turbine shaft given reference 6 in FIG. 1), and the stub axle 4 may be that of the low-pressure compressor shaft.

Naturally, the invention is not limited to an application to a turbomachine of the contra-fan type, and it extends to any turbomachine presenting an assembly of this type.

The turbine shaft 2 is disposed coaxially inside the compressor shaft stub axle 4. In well-known manner, torque is transmitted between the turbine shaft 2 and the stub axle 4 by means of fluting 8.

According to the invention, the compressor shaft stub axle 4 has a plurality of teeth 10 extending radially from its inside surface, and the turbine shaft 2 is provided at its downstream end with a plurality of axial slots 12, the teeth 10 of the stub axle 4 co-operating with the slots 12 of the turbine shaft.

Figure 2:
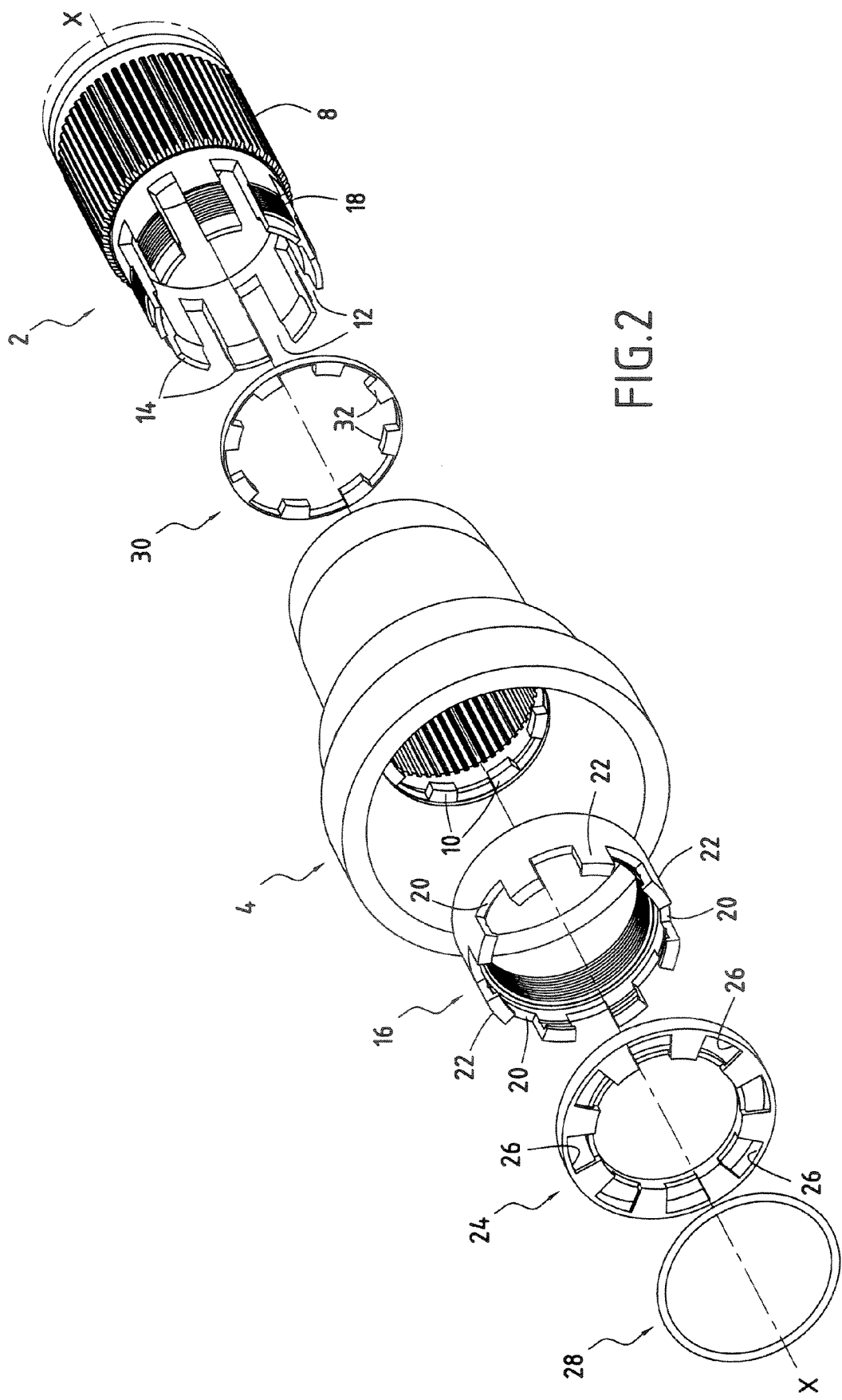
FIG. 2 is an exploded perspective view of the FIG. 1 assembly.

More precisely, as shown in FIG. 2, each slot 12 in the turbine shaft 2 is formed between two adjacent tongues 4 (or prongs) extending the downstream end of the turbine shaft.

These tongues 14 are regularly distributed around the entire circumference of the turbine shaft.

Figure 3:
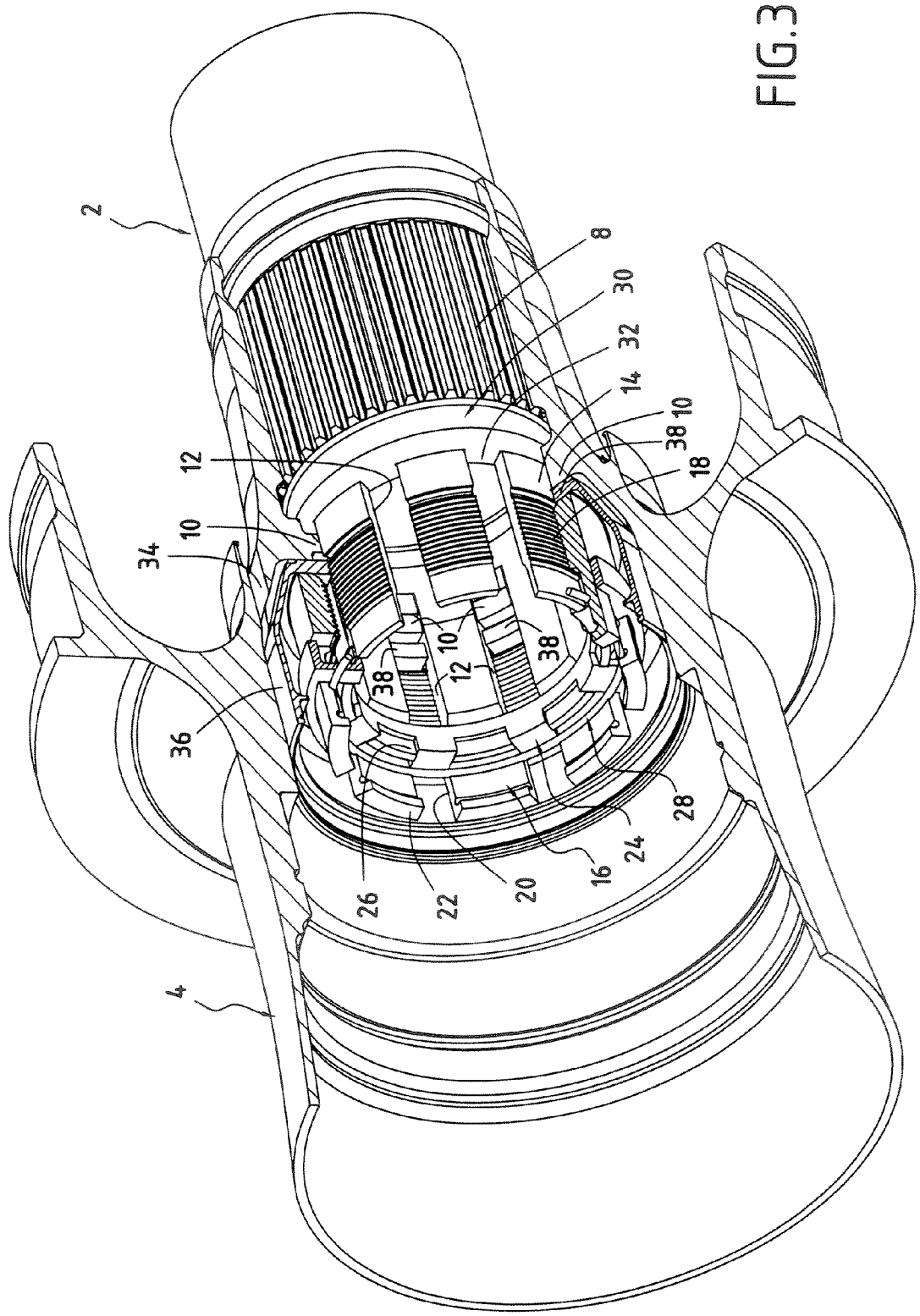
FIG. 3 is a cutaway perspective view of the FIG. 1 assembly.

In addition, and as shown in FIG. 3, each of the slots 12 is dimensioned to receive one tooth 10 of the compressor shaft stub axle 4.

It should be observed that it is not essential for the cuts that are performed at the downstream end of the turbine shaft 2 in order to form the slots 12 to pass through the entire thickness of the shaft: unlike the views shown in FIGS. 1 to 3, the slots could retain a certain thickness so as to stiffen the downstream end of the turbine shaft (said end thus presenting continuous thickness around the entire circumference of the shaft).

The assembly of the invention also includes means for clamping the downstream end of the turbine shaft 2 to the compressor shaft stub axle 4.

Such clamping means are in the form of a nut 16 that is tightened on a thread 18 formed at the downstream end of the turbine shaft 2 (i.e. formed on its tongues 14).

The nut 16 has a plurality of axial slots 20 that are regularly spaced apart, each extending between two adjacent tongues 22 extending the downstream end of the nut. These notches 20 co-operate with the teeth 10 of the compressor shaft stub axle 4, i.e. they are dimensioned so that each receives one of said teeth.

Preferably the clamping means further comprise a ring 24 for blocking rotation of the nut 16. This ring presents a plurality of openings 26 regularly spaced apart around its circumference and co-operating with the tongues 22 of the clamping nut (i.e. they are dimensioned so that each of them receives one of said tongues).

The clamping nut 16 enables the turbine shaft 2 to be held axially on the compressor shaft stub axle 4, with the ring 24 preventing the nut from turning. As shown in FIG. 1, a retaining ring 28 received in a groove (not shown) formed at the upstream end of the clamping nut 16 serves advantageously to hold the blocking ring 24 axially in position.

Figure 4:
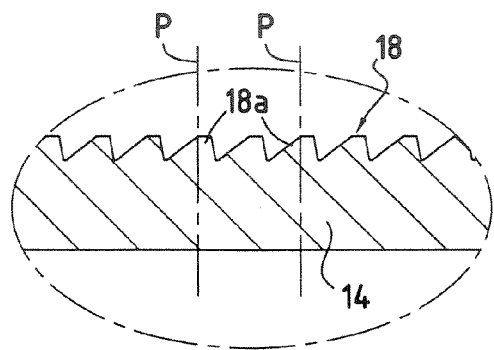
FIG. 4 is a view of a detail of the FIG. 1 assembly shown on a larger scale.

According to a particularly advantageous characteristic of the invention, each thread 18a on the threaded downstream end of the turbine shaft 2 is asymmetrical relative to a radial midplane P. As shown in FIG. 4, the plane P is a midplane relative to each thread 18a that is radial relative to the substantially cylindrical shape of the assembly. This characteristic serves to reduce the bending forces on the tongues 14 at the downstream end of the turbine shaft.

The assembly may also include a ring 30 forming an axial adjustment spacer. Such a ring has a plurality of teeth 32 that are received both in the ends of the notches 12 in the turbine shaft 2 and in axial abutment against the teeth 10 formed on the inside surface of the compressor shaft stub axle 4. The presence of this ring 30 serves to adjust the axial position (i.e. along the axis X-X) of the turbine shaft 2 relative to the compressor shaft stub axle 4.

The assembly of the invention may also include a system for lubricating a bearing disposed downstream from the assembly (such a bearing is not shown in the figures).

To do this, the compressor shaft stub axle 4 has a plurality of holes 34 for passing oil, and an annular plate 36 mounted on the turbine shaft 2 serves to guide said oil towards the bearing that is to be lubricated (FIG. 1). To make such an assembly possible, the guide plate 36 presents a plurality of teeth 38 that are of dimensions suitable for being received in the slots 12 of the turbine shaft 2 (FIG. 3). A brush gasket 40 provides sealing relative to the assembly clamping means (FIG. 1).

The assembly of the invention presents numerous advantages. In particular it is radially compact. As shown in FIG. 1, the turbine shaft 2 which is perforated makes it possible in a radial plane to group together over a common thickness both the bearing zone needed between the turbine shaft 2 and the compressor shaft stub axle 4, and also the zone required for axial retention.

In addition, the assembly of the invention makes operations of assembling and disassembling the turbine shaft 2 much easier, particularly for a turbomachine of the contra-fan type.

With this type of turbomachine, assembly is performed by mounting in succession the outer low-pressure turbine shaft 2, the ring 30 forming an axial adjustment spacer, the low-pressure compressor shaft stub axle 4, the guide plate 36, the clamping nut 16, the blocking ring 24, and the retaining ring 28.

Disassembly is performed by compressing the retaining ring 28 to move it into another groove of the clamping nut 16 so as to release the blocking ring 24, thereby enabling the nut to be loosened. The outer low-pressure turbine shaft 2 can then be disassembled without it being necessary to remote from the turbomachine: the clamping nut 16; the blocking ring 24; the guide plate 36; or the retaining ring 28. As a result, the outer low-pressure turbine shaft 2 can be disassembled without it being necessary to disassemble the low-pressure compressor shaft stub axle 4.

What is claimed is:

1. An assembly between a turbine shaft and a stub axle of a turbomachine compressor shaft, the assembly comprising a substantially cylindrical compressor shaft stub axle, a substantially cylindrical turbine shaft disposed coaxially inside the compressor shaft stub axle, means for transmitting torque between the turbine shaft and the compressor shaft stub axle, and clamping means for clamping a downstream end of the turbine shaft to the compressor shaft stub axle, wherein the compressor shaft stub axle has a plurality of teeth extending radially from its inside surface, and wherein the turbine shaft is provided at said downstream end with a plurality of axial slots, the teeth of the stub axle co-operating with the slots of the turbine shaft, wherein said teeth of the stub axle that co-operate with said slots of the turbine shaft are distinct from said means for transmitting torque between the turbine shaft and the compressor shaft stub axle.

2. An assembly according to claim 1, wherein the clamping means comprise a nut tightened on a thread formed at the downstream end of the turbine shaft, said nut having a plurality of axial slots each formed between two adjacent tongues and co-operating with the teeth of the compressor shaft stub axle.

3. An assembly according to claim 2, wherein each thread on the threaded downstream end of the turbine shaft is asymmetrical relative to a radial midplane.

4. An assembly according to claim 1, further comprising a ring forming an axial adjustment spacer, said ring having a plurality of teeth that are received both in the ends of the slots in the turbine shaft and in axial abutment against the teeth of the compressor shaft stub axle.

5. A turbomachine including an assembly between a low-pressure turbine shaft and a stub axle of a low-pressure compressor shaft according to claim 1.

6. An assembly according to claim 1, wherein said clamping means holds the compressor shaft stub axle axially.

7. An assembly according to claim 6, wherein said means for transmitting torque comprises a fluting that is axially separate from said slots and from said teeth such that said slots and teeth are not engaged with said fluting.

8. An assembly according to claim 7, wherein said fluting has dimensions that are different from dimensions of said slots and of said teeth.

9. An assembly according to claim 1, wherein said means for transmitting torque do not extend axially to said downstream end of said turbine shaft.

10. An assembly between a turbine shaft and a stub axle of a turbomachine compressor shaft, the assembly comprising a substantially cylindrical compressor shaft stub axle, a substantially cylindrical turbine shaft disposed coaxially inside the compressor shaft stub axle, a torque transmission section between the turbine shaft and the compressor shaft stub axle, and a clamp mechanism that clamps a downstream end of the turbine shaft to the compressor shaft stub axle, wherein the compressor shaft stub axle has a plurality of teeth extending radially from its inside surface, and wherein the turbine shaft is provided at the downstream end with a plurality of axial slots, the teeth of the stub axle co-operating with the slots of the turbine shaft, wherein the clamp mechanism comprises a nut tightened on a thread formed at the downstream end of the turbine shaft, said nut having a plurality of axial slots each formed between two adjacent tongues and co-operating with the teeth of the compressor shaft stub axle, and wherein the clamping mechanism further comprises a blocking ring for blocking the nut and having a plurality of openings that co-operate with the slots in the clamping nut to prevent said nut from turning.

11. An assembly according to claim 10, wherein the clamp mechanism further comprise a retaining ring for holding the blocking ring axially.

\* \* \* \* \*